Figure 1:
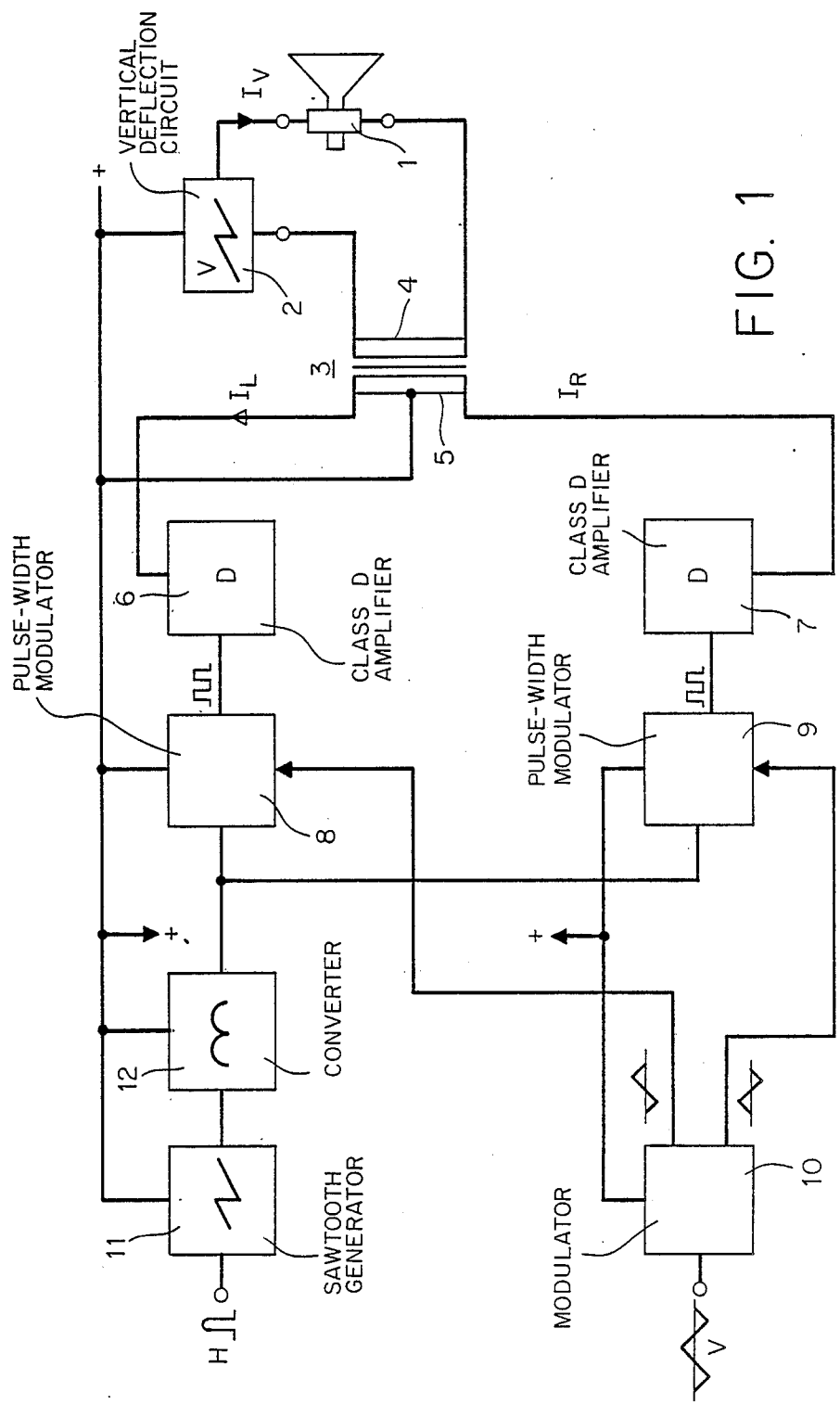

United States Patent [19]

Hartmann et al.

[11] Patent Number: 4,968,920
[45] Date of Patent: Nov. 6, 1990

[54] METHOD OF CORRECTING GEOMETRICAL DISTORTIONS ON THE SCREEN OF A CATHODE-RAY TUBE

[75] Inventors: Uwe Hartmann, Untergriesbach; Fritz Ohnemus, Villingen-Schwenningen, both of Fed. Rep. of Germany

[73] Assignee: Deutsche Thomson-Brandt GmbH, Villingen-Schwenningen, Fed. Rep. of Germany

[21] Appl. No.: 345,022

[22] Filed: Apr. 28, 1989

[30] Foreign Application Priority Data

Apr. 29, 1988 [DE] Fed. Rep. of Germany ....... 3814563

[51] Int. Cl.⁵ .............................................. H01J 29/56
[52] U.S. Cl. ................................................. 315/371
[58] Field of Search ............................... 315/371, 397

[56] References Cited

U.S. PATENT DOCUMENTS 3,939,380 2/1976 Peer ..................................... 315/397
4,048,544 9/1977 Haferl .................................. 315/408
4,088,931 5/1978 Haferl .................................. 315/371

Primary Examiner—Theodore M. Blum
Attorney, Agent, or Firm—Max Fogiel

[57] ABSTRACT

Picture tubes with an extremely flat screen exhibit peculiar geometrical distortions in that the beginning and end of the lines in the picture bend symmetrical to the midline as the result of the magnetic deflection field typical of that type of tube.

These distortions, called "bending errors," are eliminated in accordance with the invention by coupling another current into the vertical-deflection winding. A current that increases until the horizontal flyback begins is generated 5 to 10 microseconds before the electron beam ends its horizontal forward sweep and an additional current that decreases for 5 to 10 microseconds during the horizontal forward sweep is generated at the end of the horizontal flyback.

Eliminating geometrical distortions on the screen of a picture tube.

13 Claims, 3 Drawing Sheets

METHOD OF CORRECTING GEOMETRICAL DISTORTIONS ON THE SCREEN OF A CATHODE-RAY TUBE

The invention concerns a method of correcting geometrical distortions on the screen of a cathode-ray tube by coupling another current into the vertical-deflection winding.

Visible geometrical errors in the image being displayed occur in color picture tubes because the center of curvature of the screen and the center of the electron-beam deflection are very far apart. These errors can be of the cushion type extending from top to bottom and from right to left, and must be eliminated by means of known correction circuits. What are called tangent errors are eliminated by inserting an oscillating circuit tuned to 37 KHz in the horizontal-deflection circuit to increase the deflection at the midpoint of the line and decrease it at the beginning and end.

Cushion errors are eliminated by coupling a correction current, usually cosinusoidal, into the vertical-deflection circuit to modulate the vertical-deflection current.

What is called a gull-wing error expresses itself in the form of a distortion of that shape in the lines at the center of the upper and lower halves of the picture. It can be eliminated with a cosinusoidal correction current of twice the line frequency that decreases to zero at the center and bottom of the picture.

Still another annoying geometrical error appears in picture tubes that have a very flat screen and a rectangular format.

It occurs in the same vicinity as the gull-wing error and expresses itself as bends at the beginning and end of each line. The lines bend during the first and last approximately 5 microseconds of the line. The lines bend down in the upper half of the picture and up in the bottom half. The current employed to eliminate this geometrical distortion must accordingly be oppositely directed in each half of the picture, and will increase at the end of the line and decrease at the beginning of the line.

The object of the present invention is to eliminate the bending error caused by the deflection field specific to this type of tube and accordingly improve the quality of the picture on a tube with an extremely flat screen. This object is attained by the characteristics recited in the major claim. Further embodiments of the invention are recited in the subsidiary claims.

Figure 2:
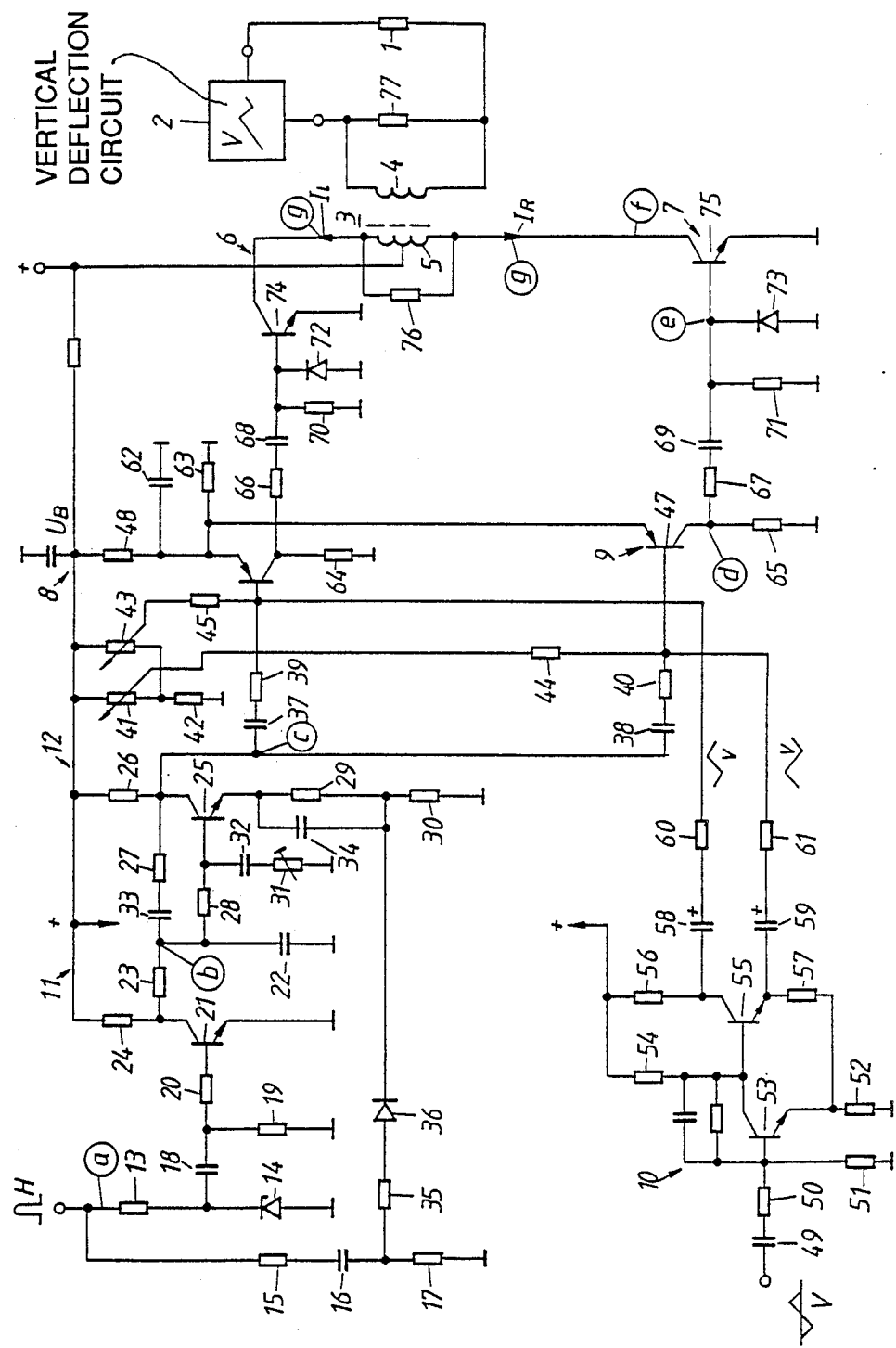

One embodiment of the invention will now be described by way of example with reference to the drawing, wherein FIG. 1 is a block diagram illustrating how the method of eliminating the aforesaid geometrical errors in accordance with the invention operates, FIG. 2 is a detailed circuit diagram of one embodiment of the system illustrated in FIG. 1, and FIGS. 3a-3g consist of graphs illustrating the results obtained by the circuitry in FIG. 2.

FIG. 1 illustrates the principle behind the circuitry that attains the object of the invention and eliminates the bending error. The circuitry generates the requisite correction current. The current generated by a vertical-deflection circuit 2 has a correction current superimposed on it and flows through a deflection coil 1. The correction current is coupled in by way of a transformer 3 with a secondary winding 4 in series with deflection coil 1. Transformer 3 has a primary winding 5 with a center tap at operating voltage UB. Each end of primary winding 5 is symmetrically connected to an amplifier 6 and 7 that operates in D service. Both amplifiers have the same function, with amplifier 6 active during the upper half of the picture and amplifier 7 active during the lower half. Since both amplifiers operate in D service, extremely little power is needed to generate the correction current. Amplifiers 6 and 7 are activated by horizontal-frequency pulses H, the width of which can also be vertical-frequency modulated. These pulses are generated by pulse-width modulators 8 and 9 that are alternately activated during the upper and lower halves of the picture by switching oppositely phased vertical-frequency signals to stages 8 and 9 from a modulator circuit 10. A sawtooth voltage for generating the signal that activates amplifiers 6 and 7 is constructed from a horizontal-frequency pulse H in a sawtooth generator 11 and is converted in a circuit 12 into a parabolic voltage for activating pulse-width modulators 8 and 9.

Figure 3:
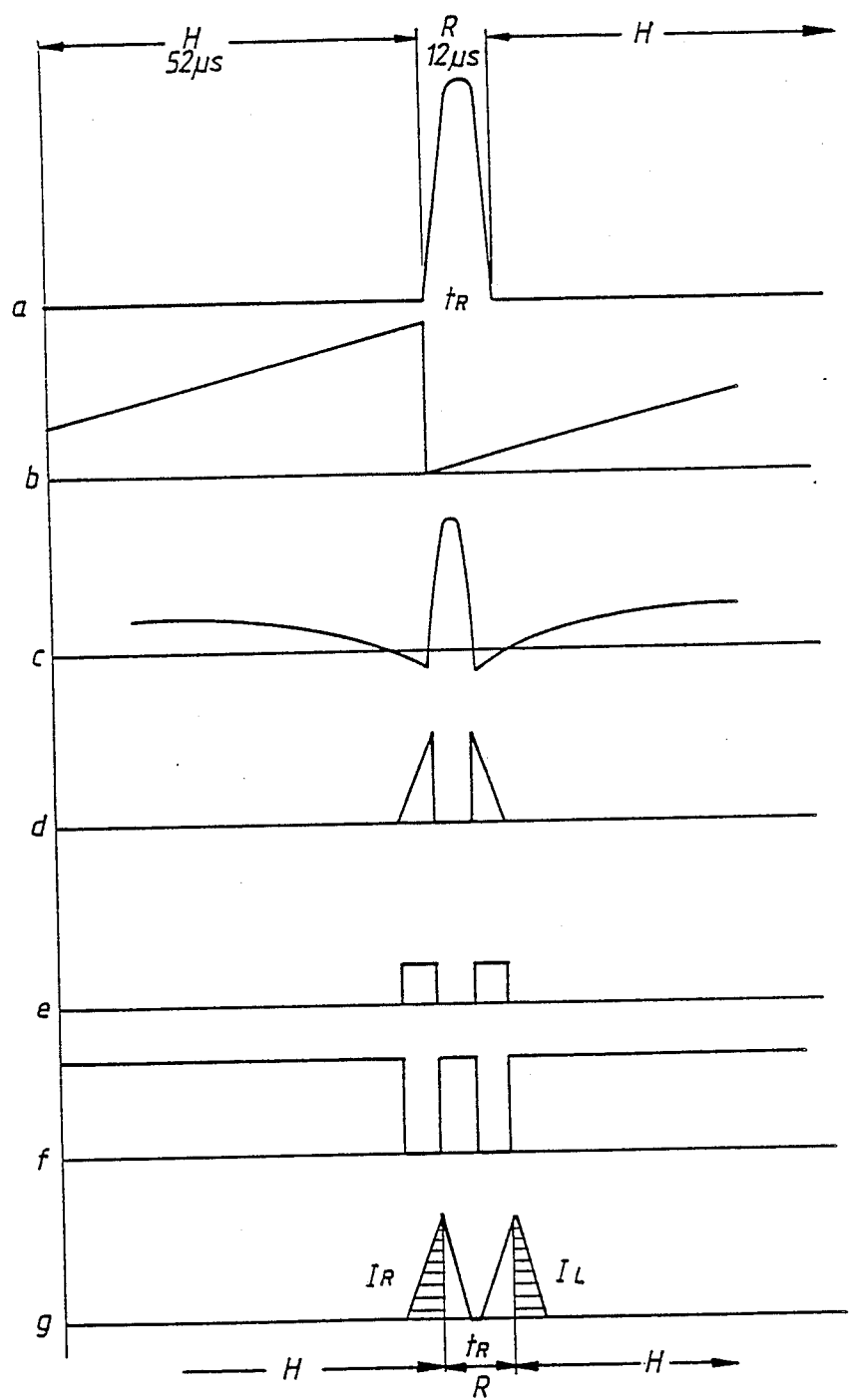

How the circuit in FIG. 1 operates will now be explained with reference to the circuit diagram in FIG. 2 and to the graphs illustrated in FIG. 3.

A line-frequency H pulse (FIG. 3a) arrives by way of a resistor 13 and is limited by a Zener diode 14 and differentiated by a capacitor 18 and a resistor 19. A brief pulse arrives by way of a resistor 20 at a transistor 21 in sawtooth generator 11, discharging by way of a resistor 23 a capacitor 22 that has previously been charged with operating voltage UB by way of a resistor 24. The sawtooth voltage (FIG. 3b) is shaped into a parabola (FIG. 3c) in a parabolic-voltage generator 12 that consists of a transistor 25, of resistors 26, 27, 28, 29, 30, and 31, and of capacitors 32, 33, and 34. The differentiated H pulse occurs at the resistor 17 of another differentiation circuit 15, 16, and 17, and its positive component is forwarded by way of a resistor 35 and a diode 36 to the emitter of a transistor 25, blocking it at the beginning of the line flyback. The parabola is made symmetrical with a resistor 31, which can be adjusted for that purpose. The resulting parabolic voltage arrives in parallel at pulse-width modulators 8 and 9 by way of capacitors 37 and 38 and resistors 39 and 40. The operating point of the pulse-width modulators can be adjusted with resistance dividers 41, 42, and 43 and 44 and 45.

The transistors 46 and 47 in pulse-width modulators 8 and 9 are alternately activated by approximately triangular, vertical-frequency, and oppositely phased voltages generated by forwarding a vertical-frequency triangular signal to the base resistor 51 of an amplifier 53 by way of a capacitor 49 and a resistor 50. The voltage that occurs at collector resistor 54 is forwarded to a phase-splitting circuit that consists of a transistor 55 and of resistors 56, 57, and 52. The oppositely phased voltages arrive at the bases of transistors 46 and 47 by way of capacitors 58 and 59 and resistors 60 and 61. Transistors 46 and 47 have a mutual emitter resistor 48. Since a capacitor 62 is low enough in ohmage for line-frequency currents, but cannot maintain constant the changes in voltage provoked by the vertical-frequency signal, a parabolic voltage with twice the vertical frequency and with positive peaks at the beginning, middle, and end of the vertical forward sweep occurs at a resistor 63.

The signal (FIG. 3d) at the collector of transistor 46 (47) is obtained from collector resistor 64 (65) and arrives by way of resistor 66 (67) and capacitor 68 (69) at base resistor 70 (71), which is in parallel with a diode 72

(73) that trims negative voltage peaks. Switching voltages (FIG. 3g) occur at base resistors 70 and 71 and open switching resistors 74 and 75. Transistor 74 remains open during the upper half of the picture and transistor 75 during the lower half of the picture. Both transistors function as switches and connect operating voltage UB to ground (FIG. 3f) by way of one half of the primary winding 5 of transformer 3. Transistor 74 is opened at the end of each line in the upper half of the picture, and an increasing magnetic field builds up in primary winding 5. The result is an increasing current in secondary winding 4 (FIG. 3g) that becomes superimposed on the vertical-deflection current in vertical-deflection coil 1. Transistor 74, which was blocked during the first phase of the flyback, is opened again just prior to the end of flyback and blocked again by no later than the end of the flyback. Since the second switch-on procedure occurs during the flyback, the induced current has no apparent effect and increases again to a prescribed terminal level (FIG. 3g). It is essential for the current to be discontinued by no later than the end of the flyback, at the beginning of the horizontal forward sweep, that is. The power stored in secondary winding 4 flows in the capacity of a steadily decreasing additional correction current into deflection coil 1 and accordingly results in the desire effect. The same procedure occurs with transistor 75, which is responsible for the lines in the lower half of the picture. It has the opposite effect of an opposing correction because currents flow through the central tap of primary winding 5 in the opposite direction. Attenuating resistors 76 and 77 prevent, by way of transformer windings 5 and 4, disruptive decay as the result of the unavoidable winding capacities.

We claim:

1. A method for correcting geometrical bending distortions on a screen of a cathode-ray tube having an electron beam with a horizontal forward sweep comprising the steps: generating a first current at a predetermined time interval before the electron beam ends its horizontal forward sweep, said first current being generated to increase until horizontal flyback begins; generating a second current at the end of horizontal flyback to decrease up to a predetermined time interval during the horizontal forward sweep, said cathode-ray tube having a vertical deflection winding; and coupling said second current into said vertical deflection winding in addition to said first current.

2. A method as defined in claim 1, wherein each said time interval is substantially 5 to 10 microseconds.

3. A method as defined in claim 1, including the steps: engaging said second current with a first signal beginning before the horizontal forward sweep ends and ending simultaneously with said horizontal forward sweep; engaging said second current with a second signal beginning during the horizontal flyback and ending simultaneously with the horizontal flyback.

4. An arrangement for correcting geometrical bending distortions on a screen of a cathode-ray tube having an electron beam with a horizontal forward sweep, comprising: means for generating a first current at a predetermined time interval before said electron beam ends its horizontal forward sweep, said first current being generated to increase until horizontal flyback begins; means for generating a second current at the end of horizontal flyback to decrease up to a predetermined time interval during the horizontal forward sweep; said cathode-ray tube having a vertical deflection winding; and means for coupling said second current into said vertical deflection winding in addition to said first current; means for engaging said second current with a first signal beginning before the horizontal forward sweep ends and ending simultaneously with said horizontal forward sweep; means for engaging said second current with a second signal beginning during the horizontal flyback and ending simultaneously with the horizontal flyback; and an output stage operating as class D amplifying means, said signals engaging said second current by activating said output stage.

5. An arrangement as defined in claim 4, wherein said coupling means comprises a transformer.

6. An arrangement as defined in claim 5, wherein said output stage comprises two circuits operating as class D amplifiers; said transformer having a primary winding connecting said two circuits in parallel.

7. An arrangement as defined in claim 6, including a source of operating voltage with a central tap, said primary winding of said transformer being connected to said operating voltage by said central tap.

8. An arrangement as defined in claim 6, including means for actuating said two circuits with vertical frequencies in a push-pull mode.

9. An arrangement as defined in claim 4, including a pulse-width modulator for adjusting magnitude and direction of said second current.

10. A method as defined in claim 1, including the steps: engaging said second current with a first signal beginning before the horizontal forward sweep ends and ending simultaneously with said horizontal forward sweep; engaging said second current with a second signal beginning during the horizontal flyback and ending simultaneously with the horizontal flyback.

11. An arrangement as defined in claim 4, wherein said time intervals are substantially 5 to 10 microseconds.

12. An arrangement as defined in claim 6, including a sawtooth generator for generating a sawtooth voltage for actuating said two circuits and constructed from a horizontal frequency pulse in said sawtooth generator; and means for converting said sawtooth voltage into a parabolic voltage for actuating a pulse-width modulator adjusting magnitude and direction of said second current.

13. An arrangement for correcting geometrical bending distortions on a screen of a cathode-ray tube having an electron beam with a horizontal forward sweep, comprising; means for generating a first current at a predetermined time interval before the electron beam ends its horizontal forward sweep, said first current being generated to increase until horizontal flyback begins; means for generating a second current at the end of horizontal flyback to decrease up to a predetermined time interval during the horizontal forward sweep; said cathode-ray tube having a vertical deflection winding; and means for coupling said second current into said vertical deflection winding in addition to said first current; means for engaging said second current with a first signal beginning before the horizontal forward sweep ends and ending simultaneously with said horizontal forward sweep; means for engaging said second current with a second signal beginning during the horizontal flyback and ending simultaneously with the horizontal flyback; and an output stage operating as class D amplifying means, said signals engaging said second current by activating said output stage; said coupling means comprising a transformer having a primary winding with a central tap; said output stage comprising two circuits operating as class D amplifiers and connected in parallel by said primary winding of said transformer; a source of operating voltage connected to said primary winding by said central tap; said two circuits being actuated with vertical frequencies in a push-pull mode; and pulse-width modulator means for adjusting magnitude and direction of said second current.

* * * * *